Aug. 26, 1952 N. E. KNAPP 2,608,145
TRACTOR PLOW
Filed Sept. 24, 1946 4 Sheets-Sheet 1
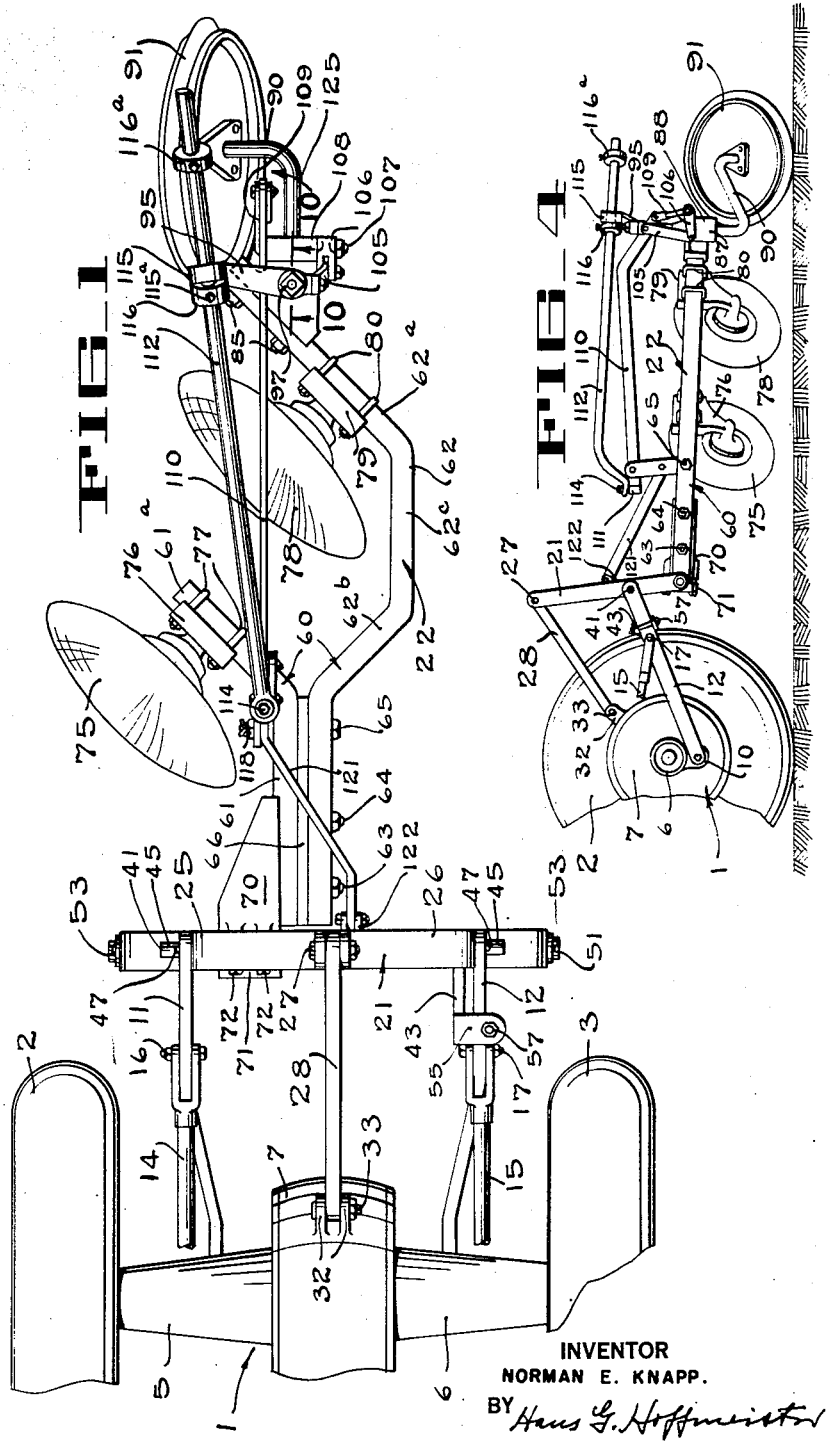
INVENTOR
NORMAN E. KNAPP.
BY Hans G. Hoffmeister
ATTORNEY

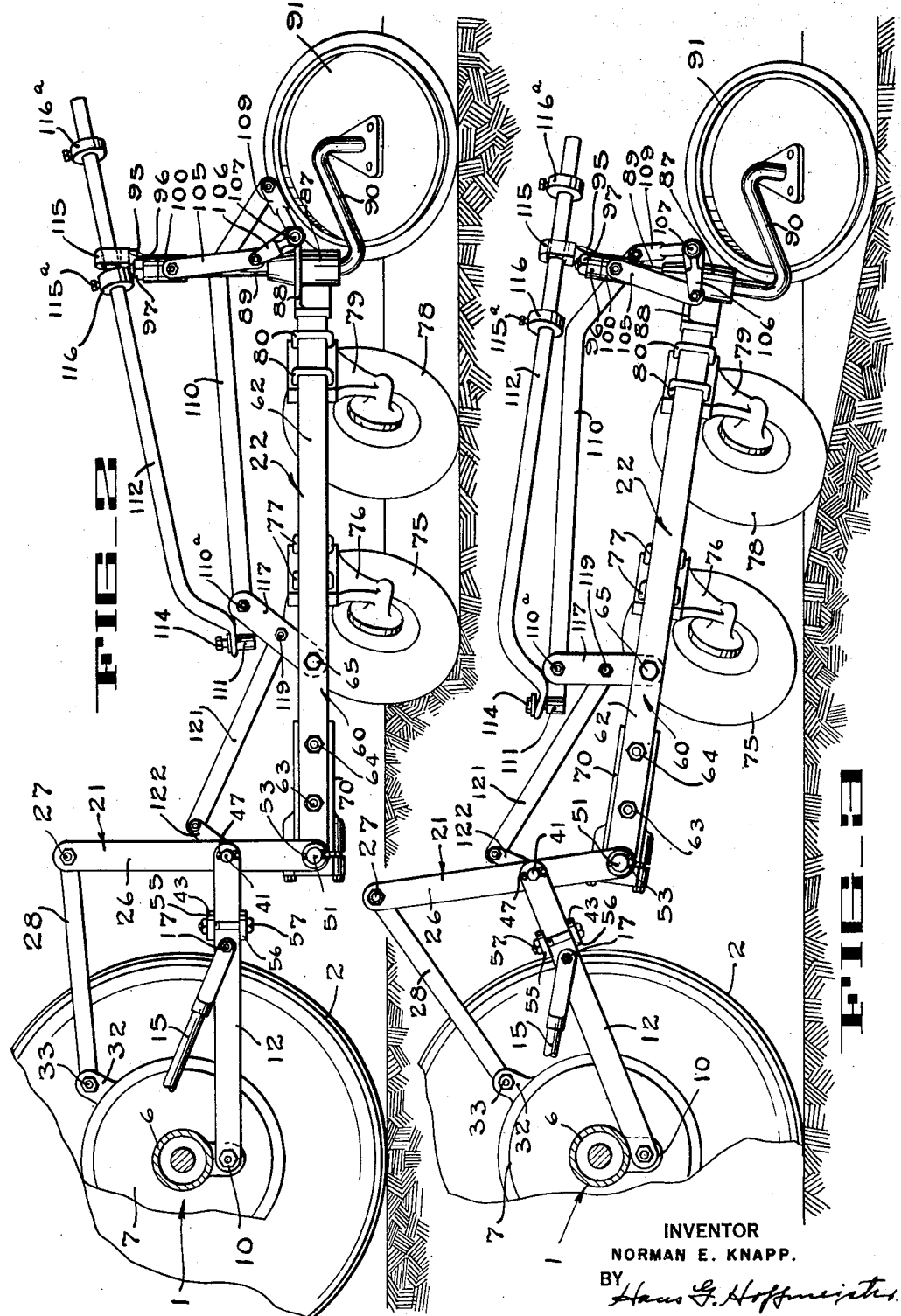

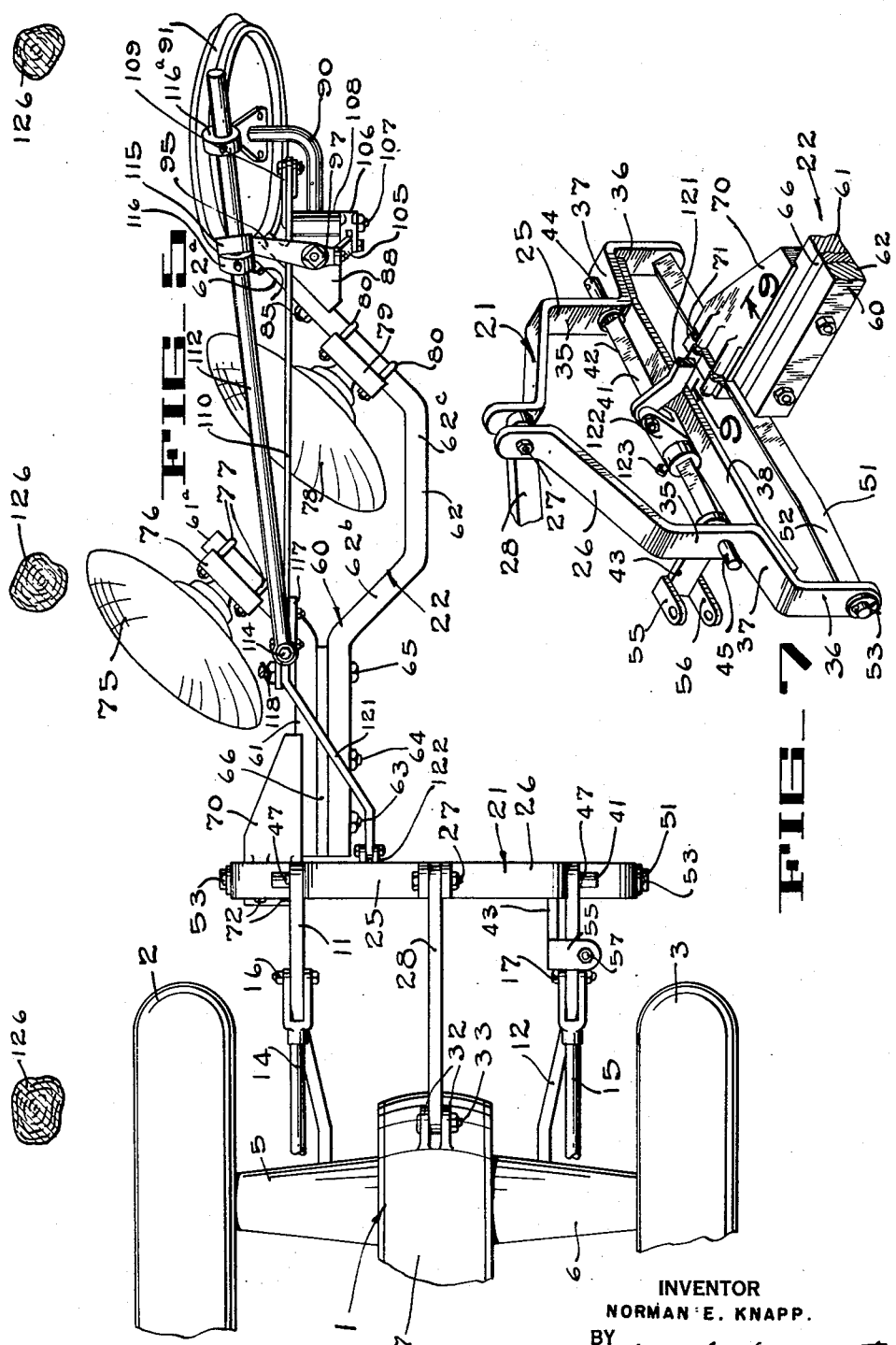

Aug. 26, 1952  N. E. KNAPP  2,608,145
TRACTOR PLOW
Filed Sept. 24, 1946  4 Sheets-Sheet 4
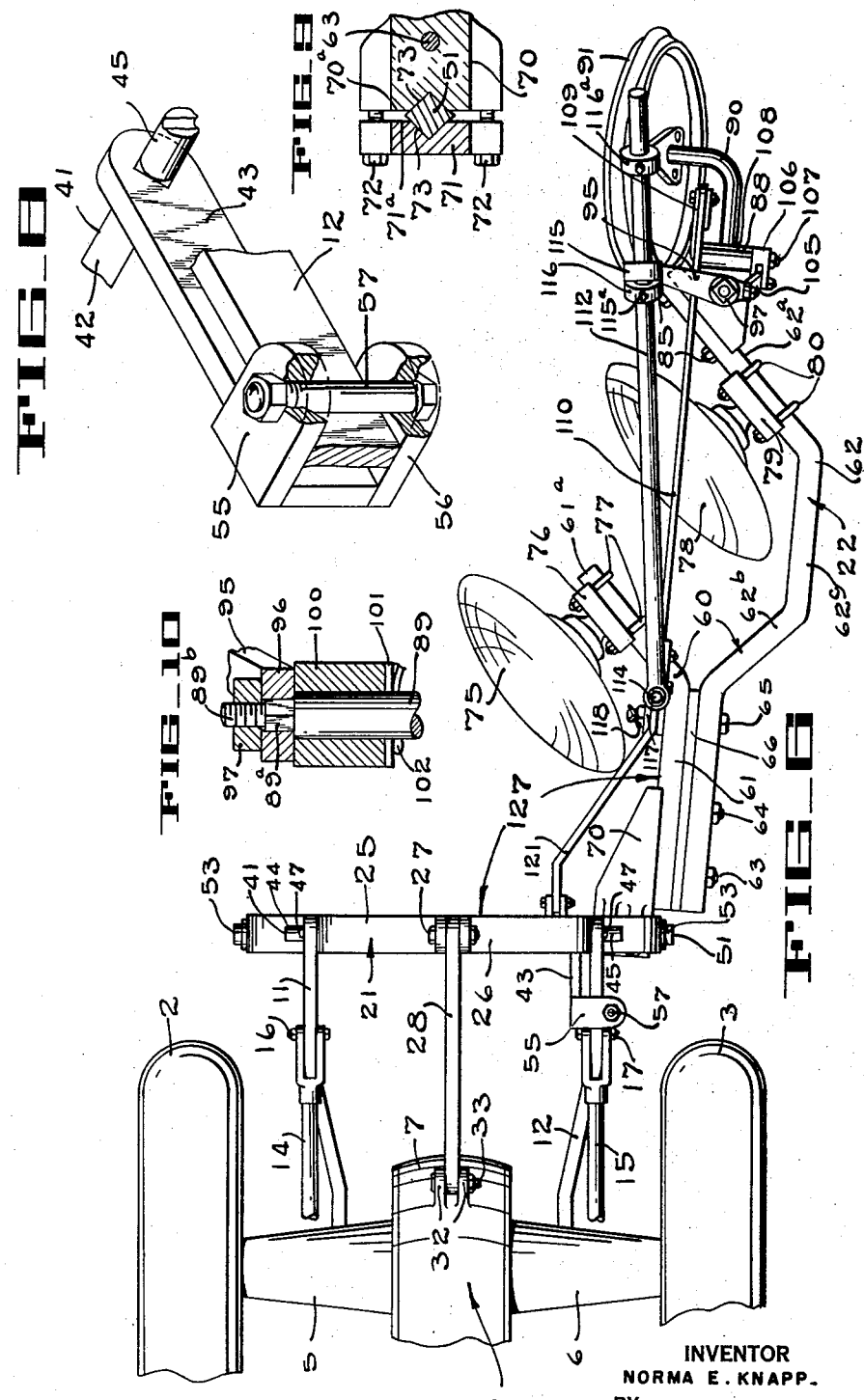
INVENTOR
NORMA E. KNAPP.
BY
Hans G. Hoffmeister
ATTORNEY Patented Aug. 26, 1952

2,608,145

UNITED STATES PATENT OFFICE 2,608,145

TRACTOR PLOW

Norman E. Knapp, San Jose, Calif.

Application September 24, 1946, Serial No. 698,995

5 Claims. (Cl. 97—50)

1

The present invention appertains to tractor drawn agricultural implements and relates more particularly to an improved tractor plow construction.

One object of the present invention is to provide a tractor drawn plow which will remain in effective plowing position in hard soil.

Another object is to provide a tractor drawn plow which may be adjusted laterally for cultivation of the soil exterior of the path of travel of the tractor.

Another object is to provide a tractor drawn plow for cutting away the soil in proximity of plants and exterior of the path of travel of the tractor or for throwing the soil toward the plants in close proximity thereof and exterior of the path of travel of the tractor.

Another object is to provide a tractor drawn plow which may be adjusted laterally within a wide range without reducing the cultivating efficiency of the plow.

Another object is to provide a tractor drawn plow which will not side-sway or "tail-out" of ground engagement irrespective of the lateral disposition of the plow with respect to the center line of travel of the tractor.

Another object is to provide a tractor drawn disc plow wherein side-sway or "tailing-out" of the plow and reduction of cutting depth of the cutting discs are prevented.

Another object is to provide a tractor drawn plow which maintains a predetermined depth of cut irrespective of variations in the hardness of the soil.

Another object is to provide a tractor drawn agricultural implement wherein upon raising of the front end of the implement by the draw bars of the tractor a simultaneous automatic raising of the rear end of the implement is effected.

Another object is to provide a tractor drawn agricultural implement responsive to the raising action of the draw bars of the tractor for effecting simultaneous raising of the front as well as the rear end of the implement.

Another object is to provide a tractor drawn disc plow wherein cutting depth of the cutting discs may be adjusted by the operator as desired during the operation of the plow.

Another object is to provide a tractor drawn plow which is efficient in operation, of simple construction and inexpensive to manufacture.

Other and further objects and advantages of the present invention will become apparent from the following description and drawings in which:

Fig. 1 is a plan view of the plow of the present

2 invention and a portion of the rear end of a tractor used for propelling the same; the plow being disposed in lowered or plowing position.

Fig. 2 is a side elevation of the device of Fig. 1.

Fig. 3 is a view similar to Fig. 2 with the plow disposed in raised position and traveling out of soil engaging or plowing position.

Fig. 4 is a view similar to Fig. 3 but at a reduced scale illustrating the plow in raised position out of the furrow on level ground.

Fig. 5 is a plan view similar to Fig. 1 but showing the plow in one of its extreme positions of lateral adjustment.

Fig. 6 is a view similar to Fig. 5 but showing the plow in its other extreme position of lateral adjustment.

Fig. 7 is a perspective view of the A-frame of the plow and a portion of the beam structure of the plow adjustably connected thereto.

Fig. 8 is a perspective view of the actuating arm associated with the A-frame structure of the plow.

Fig. 9 is an enlarged section of a portion of Fig. 7 taken along line 9—9 thereof.

Fig. 10 is an enlarged section of a portion of Fig. 1 taken along line 10—10 thereof.

Referring now to Fig. 1 of the drawings 1 designates the rear part of a tractor provided with rear traction wheels 2 and 3 and comprising rear axle housings 5 and 6 and a differential housing 7. Pivotably mounted on the axle housings 5 and 6 as shown at 10 (Fig. 2) are draft bars 11 and 12, respectively, adapted to be raised or lowered by means of mechanically or hydraulically operated actuating rods 14 and 15 (Figs. 1 and 3) pivotally connected to the draft bars 11 and 12 by bolts 16 and 17, respectively.

Pivotally connected to the rear end of the draw bars 11 and 12 is a hitch or A-frame 21 to which the implement or plow 22 is secured. The A-frame 21 (Fig. 7) comprises two outer bars 25 and 26 pivotally connected at their upper ends by means of a bolt 27 to a stabilizer bar 28 in turn pivotally secured to ears 32 of the differential housing 7 of the tractor by a bolt 33. Each of the outer bars 25 and 26 is stepped so as to provide vertically disposed portions 35 and 36 and a substantially horizontally disposed portion 37 intermediate the same. The bars 25 and 26 are connected by a transverse bar 38 the ends of which are welded to the portions 37 so that a substantially A-shaped frame is formed.

Rotatably mounted within the vertically disposed portions 35 of the outer bars 25 and 26 and extending transversely of the A-frame 21 is a rod 41. The center portion 42 of this rod intermediate the outer bars 25 and 26 is a square configuration in cross section and fixed to the same adjacent the bar 26 is an actuating arm 43. The free round ends 44 and 45 of the rod 41 extend through the bars 25 and 26 and are rotatably mounted within the rear ends of the draw bars 11 and 12, respectively, whereby the A-frame is firmly secured to the draw bars of the tractor. Cotter pins 47 prevent accidental detachment of the rod 41 and therefore of the A-frame 21 from the draw bars 11 and 12.

Rotatably mounted within the lower vertical portions 36 of the bars 25 and 26 and transversely disposed within frame 21 is a supporting bar 51 of square configuration in cross section. One end of this supporting bar is bent forwardly as shown at 52 for purposes to be described later herein. Cotter pins 53 are preferably employed for holding the supporting bar 51 securely in position within the A-frame.

The actuating arm 43 (Figs. 1 and 3) is provided with lugs 55 and 56 which are welded thereto and straddle the draw bar 12 of the tractor. A lock bolt 57 extending through the lugs 55 and 56 prevents disengagement between the lugs and the draw bar 12.

The plow 22 comprises a tool supporting frame or beam structure 60 including two beams 61 and 62. The front ends of the beams 61 and 62 are rigidly secured together by bolts 63, 64 and 65 with a spaced plate 66 disposed between the front ends of the beams. Secured to the front end of the beam structure 60 adjacent the beam 61 thereof by the bolts 63 and 64 previously referred to is a bracket or casting 70 (Figs. 7 and 9) to which a clamp plate 71 is attached by means of cap screws 72. The opposing faces 70a and 71a of the bracket 70 and plate 71, respectively, are each provided with a V-shaped groove 73 extending transversely over the entire width of the bracket and plate so as to receive the square supporting bar 51 and to permit rigid attachment of the bracket 70 and beam structure 60 to the supporting bar when the cap screws 72 are tightened and to permit lateral adjustment of the bracket 70 and beam structure 60 relative to the supporting bar 51 when the cap screws 72 are loosened. The opposing faces of the bracket 70 and plate 71 and grooves 73 are of sufficient width to rigidly hold the beam structure 60 without side-sway on the supporting bar 51.

The rear end 61a of the beam 61 (Figs. 1, 5 and 6) is disposed at an angle of about 45 degrees with respect to the front end of the beam 61 and carries a cultivating tool, i. e., a cutting disc 75, rotatably mounted in a hanger 76 which is adjustably secured to the beam portion 61a by U-bolts 77. In a similar manner the rear end 62a of the beam 62 is angularly disposed with respect to the front end thereof. The beam portion 62a also carries a cultivating tool, i. e., a cutting disc 78, rotatably mounted in a hanger 79 adjustably attached by U-bolts 80 to the beam portion 62a. Both cutting discs and their hangers are of conventional construction.

The beam portions 61a and 62a are preferably parallel to each other and the intermediate portions 62b and 62c of beam 62 are so configurated and of such length as to dispose the cutting discs 75 and 78 in staggered relation, i. e., laterally offset with respect to each other with the cutting disc 78 located a predetermined distance behind the cutting disc 75.

Secured to the rear end of the beam 62 by bolts 85 (Figs. 1, 5 and 6) is a bearing bracket 86 provided with a vertically disposed bearing portion 87 within which the vertical portion 89 of a crank-shaped axle 90 is rotatably and vertically slidably disposed. Rotatably mounted in tilted position on the axle 90 is a furrow or tiller wheel 91 of conventional construction. The vertical axle portion 89 extends a considerable distance above the bearing 87 and rigidly secured to its upper end is a tiller wheel steering arm 95. The rigid connection between arm 95 and axle 90 may be obtained in any desired manner for instance by reducing the upper end of the axle portion 89 (Fig. 10) and providing the same with a square portion 89a and a threaded portion 89b and by forming a square opening in the hub portion 96 of the steering arm 95 which tightly fits over the square axle portion 89a. The steering arm 95 is securely held in position on the square axle portion 89a by means of a nut 97 screwed onto the threaded upper end of the axle.

Rotatably mounted on the vertical axle portion 89 (Figs. 2, 3 and 10) is a block 100. This block is held against vertical movement on the axle by the hub portion 96 of the steering arm 95 and a washer 101 and a heavy cotter pin 102 secured in the axle portion 89. Pivotally secured to the block 100 (Fig. 2) is a link 105 which in turn is pivotally secured to a crank arm 106 fixed to a stud shaft 107 rotatably mounted in a horizontal bearing 108 forming an integral part of bracket 86. Fixed to the other end of the stud shaft is a crank arm 109 pivotally connected to a lever 110 provided at its front end with a boss 111 to which a tiller wheel guide or steering rod 112 is pivotally attached by means of a cap screw 114. This rod extends rearwardly beyond the arm 95 and is slidably positioned within an ear 115 forming an integral part of the steering arm 95. A steering control collar 116 is adjustably secured to the rod 112 by a set screw 115a. The front end of the lever 110 is pivotally connected at 110a to one end of a double link 117 the other end of which is pivotally secured to the free end of bolt 65 adjacent beam 61 by means of a nut 118. Pivotally connected to the double link 117 at 119 is an actuating bar 121 in turn pivotally attached to an actuating arm 122 fixed to the square portion 42 of rod 41, by means of a set screw 123, for rotation therewith.

In Figs. 1 and 2 the disc plow 22 is shown in plowing position. To lift the plow out of plowing position the operator raises the draw bars 11 and 12 of the tractor by means of the mechanically or hydraulically operated actuating rods 14 and 15 whereby the A-frame 21 and front end of the implement 22 are raised from the position shown in Figs. 1 and 2 to the position shown in Fig. 3. During the raising of the A-frame 21 and the front end of the implement the A-frame and actuating arm 122 are tilted forward due to the connection of the upper end of the A-frame 21 with the differential housing 7 by the stabilizer bar 28. Furthermore in view of the resulting change in angularity of the draw bar 12 with respect to the A-frame 21 the rod 41 and actuating arm 122 are slightly turned counterclockwise in view of the connection of the rod 41 with the draw bar 12 by means of the arm 43. This forward tilting of the A-frame and counterclockwise turning of the actuating arm 122 exerts a forward pull on the actuating bar 121 whereby the double link 117 is swung forward, i. e. counterclockwise, from the position shown in Fig. 2 to the position illustrated in Fig. 3. This counterclockwise movement of the double link 117 pulls the lever 110 forward whereby the crank arm 109, stud shaft 107 and crank arm 106 are swung from the position in Fig. 2 to the position shown in Fig. 3. Since the crank arm 106 is rotatably mounted on the bracket 86 by stud shaft 107 and is pivotally connected to the link 105, which in turn is pivotally connected to the block 100 fixed against vertical movement relative to the axle portion 89, the pivotal movement of the crank arm 106 effects raising of the bracket 86 and rear end of the implement from the position shown in Fig. 2 to the position illustrated in Fig. 3. This raising of the rear end of the implement is effected automatically incident to the raising of the front end thereof by the draw bars 11 and 12 of the tractor.

When the implement 22 during its travel and while in plowing position is raised in this manner the plow is caused to travel out of cultivating engagement with the soil as clearly illustrated in Fig. 3. As soon as the tiller wheel 91 has left the furrow and is on even ground with the rear tractor wheels 2 and 3 (Fig. 4) the implement or disc plow is disposed in inoperative or transporting position with the cultivating tools, i. e., the cutting discs 75 and 78, a sufficient distance above the ground to clear any small obstructions in their path.

To return the plow to operative position the operator lowers the draw bars 11 and 12 of the tractor 1 whereby the A-frame 21 and the front end of the implement 22 are lowered from the position shown in Fig. 4 to the position illustrated in Fig. 2. This lowering of the front end of the implement and A-frame 21 effects backward swinging of the A-frame so that the same is returned to its original vertical position (Fig. 2) and the actuating arm 122, bar 121, double link 117, lever 110 and crank arms 109 and 106 are returned to their original position (Fig. 2) whereby the rear end of the implement, i. e., the rear end of the frame 60 is lowered to its original plowing position. Of course, when the plow is lowered in this manner the lowering action of the plow will stop when the cutting discs 75 and 78 engage the ground and it is necessary to draw the plow over the ground to effect cutting of the discs into the soil under the weight of the beam structure and complete lowering of the plow to its full depth of cut. The depth of cut of the plow is regulated by the operator by lowering or raising the draw bars of the tractor until the desired depth of cut of the discs 75 and 78 during the travel of the implement is obtained. Consequently the operator can adjust the depth of cut of the discs as desired during the travel of the implement without leaving his seat on the tractor.

The tiller wheel 91 which is disposed in a tilted position travels in the furrow cut by the disc 78, i. e., on the land side of the furrow, and the control collar 116 is so positioned on the steering rod 112 as to prevent turning of the axle 90 in the direction of arrow 125 (Fig. 1). Consequently the wheel 91 prevents side draft or "tailing out" of the plow under the cutting action of the discs 75 and 78. The side draft pressure exerted by the tiller wheel 91 through axle 90 and steering arm 95 against the control collar 116 is transferred by the steering rod 112 upon the front end of the lever 110 whereby a downward pressure upon the double link 117 and beam 22 at 65 is applied. Consequently any side draft pressure exerted by the tiller wheel 91 applies a downward pressure upon the implement beam 22 at 65 a considerable distance behind the pivot formed by the supporting bar 51 so that the implement is held in firm ground engaging position thereby eliminating any possibility of "tailing-out" of the plow under the side thrust applied by the soil against the cutting discs 75 and 78 during the plowing operation. This downward pressure upon the plow in addition to the weight of the plow therefore locks the plow at its adjusted cutting depth (as determined by the position of the draw bars 11 and 12) in firm ground engaging position and permits therefore cultivation of very hard soil without any danger of "tailing-out" of the implement or reduction of cutting depth of the discs 75 and 78.

On the other hand the resistance of the linkage 122, 121, 117, 110, 109 steering rod 112 and collar 116 against the steering arm 95 prevents the tiller wheel 91 from swinging toward the land so that the same in view of its tilted position rolls along the land side of the furrow and absorbs the side pressure of the discs during the plowing operation.

It should be noted, however, that when the plow is in its raised or transporting position the rod 112 and control collar 116 are shifted forward from the position in Fig. 2 to the position in Figs. 3 and 4 whereby the arm 95 is released and the wheel 91 is permitted to swivel in one or the other direction. This free swiveling action of the tiller wheel 91 is necessary for making right or left hand turns with the implement. If desired, an adjustable stop collar 116a may be provided to limit the swiveling action of the wheel.

As previously stated herein the implement 22 may be adjusted in various lateral positions relative to the A-frame 21 and tractor 1. The lateral adjustment of the implement relative to the A-frame is effected by loosening the cap screws 72 of the clamp bracket 70 and by shifting the bracket 70 and beam structure 60 to the desired position along the supporting bar 51. Thereupon cap screws 72 are tightened to rigidly secure the implement in the desired position of lateral adjustment to tde supporting bar 51.

In Figs. 1, 5 and 6 various positions of lateral adjustment of the implement are illustrated. In Fig. 1 the implement is so adjusted as to dispose the cutting discs 75 and 78 inside the path of travel of the rear wheels of the tractor and in such case the tractor wheel 2 travels within the last previously cut furrow. In Fig. 5 the implement is disposed in its extreme right hand position, looking in the direction of travel of the tractor. In this position the rear tractor wheels travel both on solid ground and the cutting disc 75 projects outside the path of travel of the right rear tractor wheel. While in this position of lateral adjustment the implement may be used for cultivating the soil in close proximity to plants or trees, designated 126 in Fig. 5, i. e., for throwing the soil toward the same.

In its extreme left hand position of lateral adjustment illustrated in Fig. 6 the cutting disc 78 projects outside the path of travel of the left rear tractor wheel. In this position the implement is used to cut the soil away from shrubs, trees or any other plants in proximity thereof. The forwardly bent portion 52 of the supporting bar 51 previously referred to disposes the implement at an angle 127 in excess of 90 degrees to the A-frame 21 to enable the blade 78 to cut exterior of the path of travel of the left rear wheel 3. This angular disposition of the implement may be in excess of that shown in Fig. 6 if desired and is obtained by bending the left hand portion 52 of the supporting bar 51 accordingly in the manufacture thereof.

Due to the width of the casting or clamp bracket 70, the clamp plate 71 and V-shaped grooves 73 as well as the connection of both sides 25 and 26 of the A-frame 21 to the draw bars 11 and 12 of the tractor 1 the implement 22 is rigidly connected to the tractor against any lateral movement relative thereto. This lateral rigid connection between the tractor and implement also prevents sidewise swinging or "tailing-out" of the rear end of the implement caused by the side pressure against the discs during plowing operation and in conjunction with the steering control of the tiller wheel 91 and the downward pressure effected upon the plow as hereinbefore described definitely prevents "tailing-out" of the implement even under most unfavorable soil conditions.

While the present invention has been illustrated and described in connection with a tractor drawn disc plow it will be apparent that it is not limited for use in connection therewith since it may be advantageously used in connection with other tractor drawn agricultural implements. I desire it therefore to be understood that the invention is not limited to the particular application or precise details of construction illustrated, but that various applications, modifications, and variations may be resorted to without departing from the spirit or scope of the invention, and I deem myself entitled to all such applications, modifications and variations as come within the scope of the claims appended hereto.

Having thus described my invention and in what manner the same may be used what I claim and desire to protect by Letters Patent, is as follows:

1. A tractor plow comprising a tool supporting beam provided with a supporting wheel at the rear end thereof, a plurality of cultivating tools on said beam, a hitch frame for coupling the front end of the beam to the draw bars of a tractor said hitch frame comprising a rectangular supporting bar rotatably mounted on and extending transversely of the hitch frame, and a clamp for adjustably securing the tool frame to said supporting bar, one end of said supporting bar being bent forwardly in the direction of travel of the plow to vary the angular disposition of the beam relative to the supporting bar and to thereby dispose at least one of said tools for cultivation of soil exterior of the path of travel of the tractor.

2. A tractor plow comprising a tool supporting beam provided with a plurality of cultivating tools and a supporting wheel at the rear end thereof, a casting on the front end of the beam and provided with a V-shaped groove extending transversely of the front face of the casting, a clamping plate provided with a complemental V-shaped groove in its rear face, a hitch frame for coupling the beam to the draw bars of a tractor, a beam supporting bar rotatably mounted on said hitch frame and disposed within the recess formed by said grooves in said casting and plate, one end of said supporting bar being bent forwardly in the direction of travel of the plow, and means for forcing said clamp plate toward said casting to thereby rigidly clamp the casting and beam to said supporting bar and for releasing the clamp plate to permit adjustment of the casting and beam to one or the other end of the supporting bar to dispose at least one of said cultivating tools for cultivation of soil exterior of the path of travel of the tractor at one or the other side thereof.

3. In combination a tractor having draw bars and means for raising or lowering the same, an implement comprising a beam, cultivating tools mounted on said beam, means for connecting the front end of the beam to the draw bars of the tractor, means for adjustably supporting the rear end of the beam including a crank axle having a vertically disposed portion rotatably mounted on said beam and a substantially horizontally disposed portion, a tiller wheel rotatably mounted on the horizontally disposed axle portion, a linkage system associated with said beam, rear end supporting means and front end connecting means and cooperating with said draw bars for simultaneously raising or lowering the rear end of the beam with the front end of the beam upon raising or lowering of the draw bars of the tractor, and a steering arm and rod interconnecting said tiller wheel and linkage system for translating turning of the tiller wheel under side thrust of the cultivating tools into downward pressure upon said linkage system when said beam is in lowered position whereby the beam is locked against upward movement.

4. A hitch mechanism for connecting an implement in trail-behind relation to a tractor comprising a substantially A-shaped frame including side bars connected at their upper ends, a stabilizer bar for pivotally connecting the upper portion of the frame to the tractor, a transverse bar rigidly connecting the side bars, an implement supporting bar rotatably mounted on said frame at the lower ends of said side bars and held against lateral movement relative to said frame, an actuating rod rotatably mounted on said frame in spaced relation to and above said supporting bar and including portions projecting from the side bars exterior of the frame for mounting the rod on the draw bars of the tractor, an actuating arm fixed to said actuating rod and adapted to be connected to one of the draw bars of the tractor, and a second actuating arm fixed to said actuating rod and adapted to be connected to control mechanism of the implement.

5. A hitch mechanism for connecting an implement in trail-behind relation to a tractor comprising a substantially A-shaped frame including side bars connected at their upper ends, a stabilizer bar for pivotally connecting the upper portion of the frame to the tractor, a transverse bar rigidly connecting the side bars, an implement supporting bar rotatably mounted on said frame at the lower ends of said side bars and held against lateral movement relative to said frame, an actuating rod rotatably mounted on said frame in spaced relation to and above said supporting bar and including portions projecting from the side bars exterior of the frame for mounting the rod on the draw bars of the tractor, an actuating arm fixed to said actuating rod and provided with transversely disposed brackets for connecting said actuating arm for simultaneous movement with the draw bars of the tractor, and a second actuating arm laterally adjustable on said actuating rod and connected to said rod for rotation therewith and adapted to be pivotally connected to control mechanism of the implement.

NORMAN E. KNAPP.

(References on following page)

REFERENCES CITED

The following references are of record in the file of this patent:

UNITED STATES PATENTS

| Number | Name | Date |
|---|---|---|
| 2,098,472 | Strandlund | Nov. 9, 1937 |
| 2,247,534 | Von Schlegell | July 1, 1941 |
| 2,320,141 | Kott | May 25, 1943 |
| 2,322,342 | Bunn | June 22, 1943 |
| 2,372,459 | Todd | Mar. 27, 1945 |
| 2,386,378 | Wippel | Oct. 9, 1945 |

FOREIGN PATENTS

| Number | Country | Date |
|---|---|---|
| 22,199 of 1935 | Australia | May 11, 1936 |